UNITED STATES PATENT OFFICE.

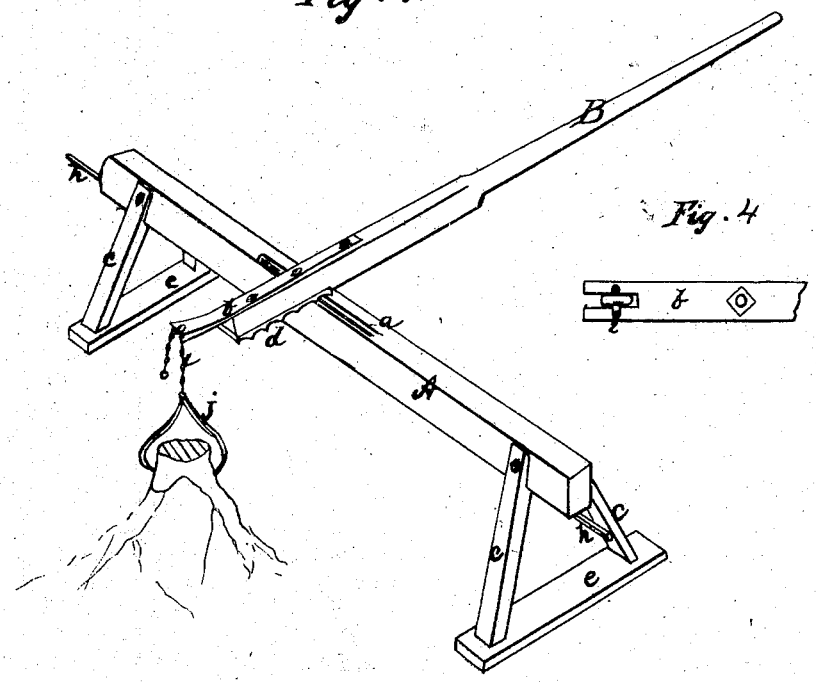
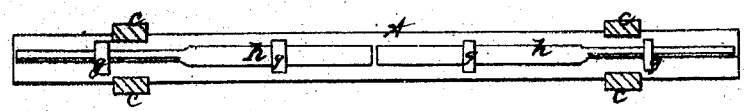

SOLOMON S. AVIS, OF PENN'S GROVE, NEW JERSEY.

IMPROVED STUMP-EXTRACTOR.

Specification forming part of Letters Patent No. 75,512, dated March 17, 1868.

*To all whom it may concern:*

Be it known that I, SOLOMON S. AVIS, of Penn's Grove, in the county of Salem and State of New Jersey, have invented a new and Improved Stump-Extractor; and I do hereby declare that the following is a full, clear, and exact description thereof, which will enable those skilled in the art to make and use the same, reference being had to the accompanying drawings, forming part of this specification, in which—

Figure 1 is a perspective view of my improved stump-extractor. Fig. 2 is a view of the bottom of the beam of the trestle-horse of the same. Fig. 3 is a detail section of the beam of the trestle-horse and fulcrum-plate of the same. Fig. 4 is a detail view of chain-plate.

Similar letters of reference indicate corresponding parts.

This invention is, as its title imports, for the purpose of extracting stumps, and is more particularly adapted for the extraction of light stumpy growth of newly-cleared land.

It consists of a trestle-horse composed of the beam A, having legs $c$, which latter rest on and are affixed to pedestal-planks $e$, for the purpose of preventing the legs from sinking into the soil when the same is soft or yielding.

The stump is extracted by means of the lever B, which is commonly of tough wood, and is provided with the plates $b$ and $d$, as shown. The plate $b$ is bolted or otherwise firmly affixed to the top of the lever, and the end of said plate projects a short distance beyond the end of the lever and terminates in a notch or fork, as shown. This notch is for the purpose of bringing the chain $i$ of the hook $j$ through, so as to bring the strain centrally upon the plate and lever. The chain requires only to be laid in the plate $b$, as shown, with a few turns around the ends of the notch in the plate $b$, when it will hold by the friction of the links, due to the close manner in which a chain hugs or lies when wrapped or wound around any rigid object. The first turn of the chain is shown, to indicate the manner of applying it.

Under the beam A are seen handles $h$, which slide in iron staples or guides $g$. These handles are drawn out and seized when the horse is to be moved to a different point of operation.

The plate $d$ is bolted to the under side of the beam and is notched, scalloped, or indented, substantially as shown, for the purpose of catching upon the fulcrum-rod $a$, which latter is firmly affixed to the top of the beam A, as shown. The plate $d$ and rod $a$ prevent the "nip" or hold of the lever from slipping when strain is brought upon it.

The operation of this machine will be obvious from the foregoing. It is simple, cheap, and portable, and for small stumps and light growth has been proved by actual trial to be rapid and efficient in its operation.

I claim as new and desire to secure by Letters Patent—

1. The trestle-horse A $c\ c\ c\ c\ e\ e$ and lever B, substantially as shown and described, in combination with the chain $i$, as and for the purpose set forth.

2. The plates $b$ and $d$, substantially as shown and described, in combination with the lever B and trestle-horse, as and for the purposes set forth.

3. The pedestal-planks $e$, in combination with the trestle-horse and lever B, substantially as and for the purpose shown and described.

SOLOMON S. AVIS.

Witnesses:
S. L. THOMPSON,
S. R. LEAP.